United States Patent
Kemoun et al.

(10) Patent No.: US 7,473,405 B2
(45) Date of Patent: Jan. 6, 2009

(54) FLUID DISTRIBUTION APPARATUS FOR DOWNFLOW MULTIBED POLY-PHASE CATALYTIC REACTOR

(75) Inventors: Abdenour Kemoun, Pleasant Hill, CA (US); Krishniah Parimi, Concord, CA (US); Duyen T. Nguyen, Castro Valley, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 433 days.

(21) Appl. No.: 10/965,167

(22) Filed: Oct. 13, 2004

(65) Prior Publication Data

US 2006/0078483 A1  Apr. 13, 2006

(51) Int. Cl.
B01J 8/02 (2006.01)
B01F 3/04 (2006.01)
(52) U.S. Cl. .................... 422/194; 422/195; 422/220; 422/224; 261/96
(58) Field of Classification Search ................ 422/194, 422/195, 191, 220, 224; 261/96
See application file for complete search history.

(56) References Cited

U.S. PATENT DOCUMENTS

| | | | |
|---|---|---|---|
| 3,598,541 A | 8/1971 | Hennemuth et al. | |
| 4,009,095 A | 2/1977 | Carson | |
| 4,140,625 A * | 2/1979 | Jensen | 208/146 |
| 4,357,304 A | 11/1982 | Pegels et al. | |
| 4,446,112 A | 5/1984 | Den Hartog | |
| 4,550,000 A | 10/1985 | Bentham | |
| 4,566,883 A | 1/1986 | Paardekooper et al. | |
| 4,568,523 A | 2/1986 | Wijffels et al. | |
| 4,591,367 A | 5/1986 | Pek et al. | |
| 4,623,493 A | 11/1986 | Bentham | |
| 4,627,941 A | 12/1986 | Bentham | |
| 4,693,807 A | 9/1987 | Westerman et al. | |
| 4,743,356 A | 5/1988 | Söderberg et al. | |

(Continued)

FOREIGN PATENT DOCUMENTS

EP          0 244 896 A2    11/1987

(Continued)

*Primary Examiner*—N. Bhat
(74) *Attorney, Agent, or Firm*—Timothy J. Hadlock

(57) ABSTRACT

The invention in one embodiment is a nozzle device for coupling with a fluid distribution conduit for improving the distribution of an upward or downwardly flowing poly-phase mixture including at least one gas phase and at least one liquid phase, above at least one packed bed of granular solid or fluidized bed. The fluid distribution conduit for receiving liquid and gas phases has one or more lateral openings for flow over an upper portion of its height through which a gas phase can enter and has fluid distribution conduit having one or more lateral openings for flow over at least a lower portion of its height through which a liquid phase can enter the fluid distribution conduit. It also has at least one lower cross section for flow through which a mixture of gas and liquid communicate with a packed bed of granular solid or a fluidized bed. The nozzle device includes a venturi nozzle having an outer diameter not greater than an inner diameter of the lower cross section of the fluid distribution conduit, wherein the nozzle device may be fixedly coupled to and co-axially aligned with the lower cross section of the fluid distribution conduit. It is for accelerating and dispersing the liquid and gas phases passing out of the conduit.

37 Claims, 9 Drawing Sheets

U.S. PATENT DOCUMENTS

| | | | |
|---|---|---|---|
| 4,751,057 A | 6/1988 | Westerman | |
| 4,752,307 A | 6/1988 | Asmus et al. | |
| 4,755,198 A | 7/1988 | Darton | |
| 4,767,424 A | 8/1988 | McEwan | |
| 4,880,451 A | 11/1989 | Konijn | |
| 4,933,047 A | 6/1990 | Bannon | |
| 4,954,294 A | 9/1990 | Bannon | |
| 4,960,571 A | 10/1990 | Bhagat et al. | |
| 4,975,036 A | 12/1990 | Jagannathan | |
| 5,300,132 A | 4/1994 | Konijn | |
| 5,306,418 A | 4/1994 | Dou et al. | |
| 5,403,560 A | 4/1995 | Deshpande et al. | |
| 5,462,719 A | 10/1995 | Pedersen et al. | |
| 5,492,617 A | 2/1996 | Trimble et al. | |
| 5,545,382 A | 8/1996 | Sechrist | |
| 5,601,797 A | 2/1997 | Gentry | |
| 5,635,145 A | 6/1997 | Den Hartog et al. | |
| 5,648,051 A | 7/1997 | Trimble et al. | |
| 5,660,715 A | 8/1997 | Trimble et al. | |
| 5,683,629 A | 11/1997 | Konijn | |
| 5,688,445 A | 11/1997 | Wrisberg | |
| 5,762,888 A | 6/1998 | Sechrist | |
| 5,772,970 A | 6/1998 | Okamoto | |
| 5,837,208 A | 11/1998 | Grott et al. | |
| 5,904,907 A | 5/1999 | Shih | |
| 5,918,637 A | 7/1999 | Fleischman | |
| 5,935,413 A | 8/1999 | Boyd et al. | |
| 5,942,162 A | 8/1999 | Gamborg et al. | |
| 5,989,502 A | 11/1999 | Nelson et al. | |
| 6,093,373 A | 7/2000 | Darmancier et al. | |
| 6,098,965 A | 8/2000 | Jacobs et al. | |
| 6,180,068 B1 | 1/2001 | Boyd et al. | |
| 6,183,702 B1 * | 2/2001 | Nguyen et al. | 422/194 |
| 6,338,828 B1 | 1/2002 | Stupin et al. | |
| 6,386,520 B2 | 5/2002 | McEwan | |
| 6,455,015 B1 | 9/2002 | Kilroy | |
| 6,460,833 B2 | 10/2002 | Konijn | |
| 6,460,834 B2 | 10/2002 | Konijn | |
| 6,494,440 B2 | 12/2002 | Bosmans et al. | |
| 6,508,459 B1 | 1/2003 | Jacobs et al. | |
| 6,537,458 B2 | 3/2003 | Polderman | |
| 6,588,735 B2 | 7/2003 | Bosmans et al. | |
| 6,610,879 B2 * | 8/2003 | Yoneda et al. | 560/205 |
| 6,613,219 B2 * | 9/2003 | Harter et al. | 208/146 |
| 6,626,424 B2 | 9/2003 | Ngan et al. | |
| 6,669,915 B1 | 12/2003 | Boyd et al. | |
| 7,060,232 B2 * | 6/2006 | Harter et al. | 422/190 |
| 7,238,329 B2 * | 7/2007 | Boyer et al. | 422/194 |
| 2002/0112990 A1 | 8/2002 | Iaccino et al. | |
| 2002/0172632 A1 | 11/2002 | Chou | |
| 2002/0179496 A1 | 12/2002 | Kilroy | |
| 2003/0090009 A1 | 5/2003 | Zich et al. | |
| 2003/0147788 A1 | 8/2003 | Olbert et al. | |
| 2004/0007505 A1 | 1/2004 | Meier et al. | |
| 2004/0028579 A1 | 2/2004 | Van Der Meer et al. | |
| 2004/0086435 A1 | 5/2004 | Boyer et al. | |
| 2004/0097756 A1 | 5/2004 | Thiel et al. | |
| 2004/0120863 A1 | 6/2004 | Chen et al. | |
| 2005/0062178 A1 * | 3/2005 | Harter et al. | 261/96 |
| 2006/0078483 A1 | 4/2006 | Kemoun et al. | |

FOREIGN PATENT DOCUMENTS

EP      0 602 287 B1     3/1997

* cited by examiner

FLUID DISTRIBUTION APPARATUS FOR DOWNFLOW MULTIBED POLY-PHASE CATALYTIC REACTOR

I. COPYRIGHT NOTICE AND AUTHORIZATION

This patent document contains material which is subject to copyright protection.

© Copyright 2004. Chevron U.S.A. Inc. All rights reserved.

With respect to this material which is subject to copyright protection. The owner, Chevron U.S.A. Inc., has no objection to the facsimile reproduction by any one of the patent disclosure, as it appears in the Patent and Trademark Office patent files or records of any country, but otherwise reserves all rights whatsoever.

II. FIELD OF THE INVENTION

This invention relates to a fluid distributor assembly for multi-bed, down-flow or up-flow catalytic reactors, that is, reactors which include vertically superimposed packed or fluidized beds of particulate catalytic material and where a liquid or liquid and gas mixture is processed as it flows up or down through the packed or fluidized beds. This type of reactor is used in the petroleum and chemical processing industries for carrying out various catalytic reactions, such as hydrotreating, hydrofinishing, hydrocracking, and dewaxing

III. BACKGROUND OF THE INVENTION

Many catalytic processes are carried out in reactors that contain a series of separate catalytic beds. Reactors used in the chemical, petroleum refining and other industries for passing liquids or mixed-phase liquid/vapor mixtures over packed beds of particular solids are employed for a variety of different processes. Typical of such processes in the petroleum refining industry are catalytic dewaxing, hydrotreating, hydrodesulfurisation, hydrofinishing and hydrocracking. In these processes a liquid phase is typically mixed with a gas or vapor phase and the mixture passed over a particulate catalyst maintained in a packed bed in a downflow reactor.

Uniform distribution of liquid/vapor flow to a catalyst bed is an important consideration in assuring efficient utilization of a catalyst. Efficient catalyst use will result in improved yields and product qualities, increased run lengths, and, if desired, increased throughput through the unit. Uniform flow distribution is also a necessary condition to avoid temperature mal-distribution and hot spots in a reactor.

Typically, mixing devices, e.g., as disclosed in U.S. Pat. No. 6,183,702, are located above an associated fluid distribution system; for example, a horizontally disposed distribution plate or tray. Many different types of fluid distribution systems are known. Some are simple and comprise little more than a pierced or slotted plate. The distribution plate collects the fluid (vapor and liquid), uniformly distributes it across the plate and discharges the fluid on to the catalyst bed. Other types of fluid distribution systems contain a number of downcomers, e.g., "bubble cap" or "chimney" assemblies, which may be disposed over one or more openings in the distribution plate. The bubble cap or chimney provides intimate mixing of the vapor and liquid before the mixed phase fluid is distributed across the catalyst bed below. Deficiencies in existing fluid distribution systems require a large number of slots, bubble caps, or chimneys, which increases cost and complexity and creates more possibility of clogging or other types of failure.

A good flow distribution device should meet the following four basic requirements: provide even distribution of feed to a catalyst bed over a range of gas and liquid rates; be tolerant to certain out-of-levelness of the distribution tray; provide good gas-liquid mixing and heat exchange, and require minimum catalyst bed height to reach equilibrated flow distribution. Other considerations are that they require minimum height to conserve reactor space and are easy to maintain.

One of the key considerations in flow distributor design is the discharge pattern of liquid and gas from the device. A standard chimney distributor provides only some point contacts of liquid with the catalyst bed. It takes a finite bed height to adequately wet the catalyst surface and the reactions to occur.

Bubble cap distributors usually give a mix of some liquid draining along the riser wall, some liquid coming out as a spray and a few droplets occasionally dropping from the center of the riser. In general, we have been satisfied with this pattern of gas and liquid coming out of the riser in a bubble cap distributor. Such a pattern can uniformly wet the catalyst surface directly underneath the distributor. The catalyst bed depth needed for a complete equilibrated flow distribution and catalyst wetting may still be several inches, depending on how consistent and how divergent a spray that is achieved through the flow distributor.

A more uniform and consistent spray pattern and more uniform catalyst wetting in a short length of catalyst bed are desired, and the proposed new design achieves this objective. The new design also satisfies the other requirements as stated earlier.

IV. BRIEF DESCRIPTION OF THE DRAWINGS

FIG. 1 is a schematic, perspective side cut-away view of showing the distributor assembly in the context of a reactor vessel according to the present invention.

FIG. 2 is a schematic, perspective side cut-away view of another preferred embodiment of the distributor assembly according to the present invention having slotted passageways for both liquid and gas, a cylindrical passageway for gas connected to the slotted passageway for gas, and having the outlet of the cylindrical passageway for the gas extending below the slotted passageways for the liquid and forming an annual passageway for the liquid.

FIG. 3 is a schematic, perspective side cut-away view of another preferred embodiment of the distributor assembly according to the present invention having slotted passageways for gas connected to a cylindrical passageway for gas and having only an annular passageway for liquid.

FIG, 4 is similar to FIG. 2.

Figure 7:
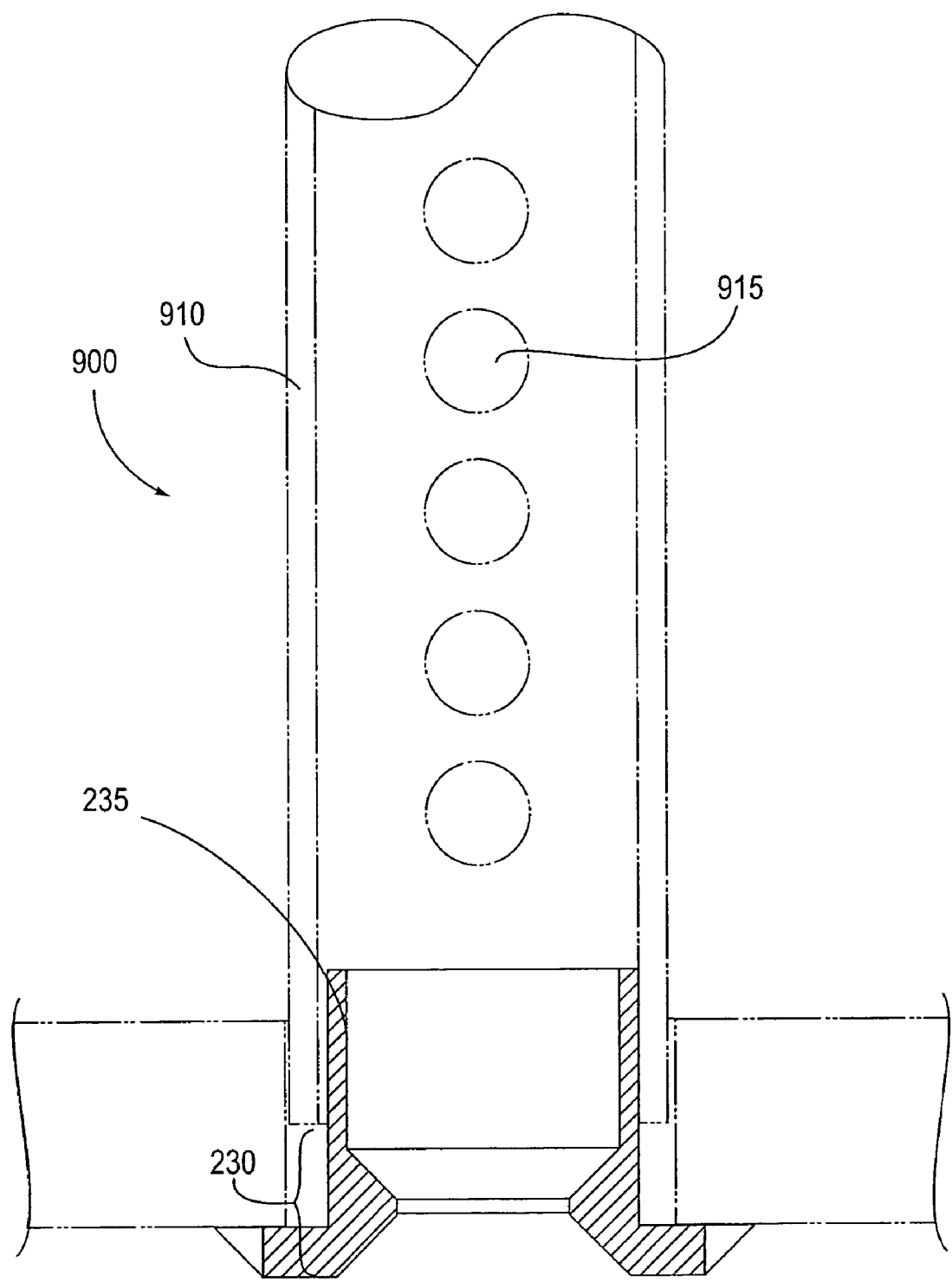
FIG. 7 is a schematic, perspective side cut-away view of another embodiment of the distributor assembly according to the present invention having slotted and cylindrical passageways for gas and liquid.
Figure 8:
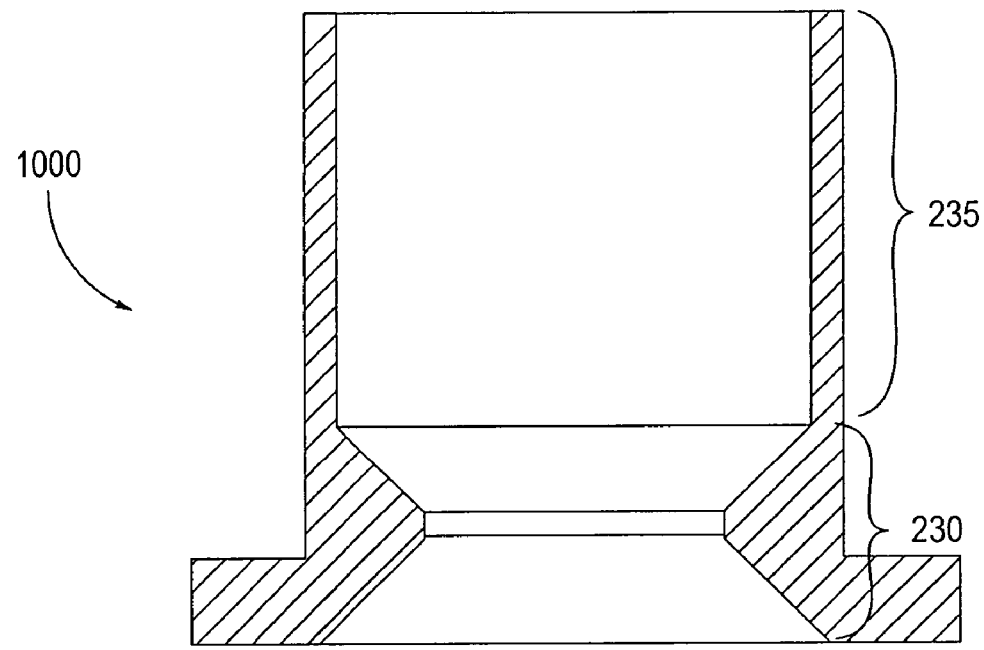
FIG. 8 is a schematic, perspective side cut-away view of a lower portion of the embodiment of FIG. 7 showing the gas/liquid outlet.

Known risers or downcomers, such as shown, e.g., in FIG. 7, but without the venturi nozzle and sleeve assembly of the invention shown in one embodiment in FIG. 8, have poor distribution patterns. In some case such known risers/chimneys only distribute two liquid streamlines coming out the chimney.

V. SUMMARY OF THE INVENTION

The invention includes a distributor device for distributing a downwardly flowing poly-phase mixture, including at least one gas phase and at least one liquid phase, above at least one bed of granular solid, the device including: at least one tray located above a bed of granular solid; a plurality of fluid distribution conduits for receiving liquid and gas phases, each of the conduits including at least one upper cross section for flow through which a gas phase can enter the mixer conduit, and at least one lower cross section for flow through which a mixture of gas and liquid communicate with a bed of granular solid, the fluid distribution conduits having one or more lateral openings for flow over at least a portion of their height through which a liquid phase can enter the fluid distribution conduit, and having a cylindrical passageway for gas having an inlet connected to the upper cross section and having an outlet extending below the lateral openings for the liquid phase, thereby forming an annular passageway for the liquid phase; the upper cross section for flow allowing the majority of the gas phase of the mixture to pass and the lateral openings for flow allowing the passage of the liquid phase into the fluid distribution conduits and at least a portion of the gas phase; and a venturi nozzle having an inlet and an outlet fixedly coupled to and co-axially aligned with the lower cross section of the conduit for accelerating and dispersing the liquid and gas phases passing out of the conduit.

In an alternate embodiment, the invention includes a distributor device for distributing a downwardly flowing poly-phase mixture, including at least one gas phase and at least one liquid phase, above at least one bed of granular solid, the device including: a fluid distribution conduit for receiving liquid and gas phases, the fluid distribution conduit having one or more lateral openings for flow over an upper portion of its height through which a gas phase can enter the fluid distribution conduit; the fluid distribution conduit having one or more lateral openings for flow over at least a lower portion of its height through which a liquid phase can enter the fluid distribution conduit; and at least one lower cross section for flow through which a mixture of gas and liquid communicate with a bed of granular solid, and having a cylindrical passageway for gas having an inlet connected to the upper portion lateral openings of the fluid distribution conduit for the gas phase and having an outlet extending below the lower portion lateral openings of the fluid distribution conduit for the liquid phase, thereby forming an annular passageway for the liquid phase; the lateral openings over an upper portion of its height for allowing the majority of the gas phase of the mixture to pass and the lateral openings over a lower portion of its height for allowing the passage of the liquid phase into the fluid distribution conduits; and a venturi nozzle having an inlet and an outlet fixedly coupled and co-axially aligned to the lower cross section of the conduit for accelerating and dispersing the liquid and gas phases passing out of the conduit.

In another alternate embodiment, the invention includes a distributor device for distributing a downwardly flowing poly-phase mixture, including at least one gas phase and at least one liquid phase, above at least one bed of granular solid, the device including: a fluid distribution conduit for receiving liquid and gas phases, the conduit including at least one upper cross section for flow through which a gas phase can enter the mixer conduit, and at least one lower cross section for flow through which a mixture of gas and liquid communicate with a bed of granular solid, the fluid distribution conduit having one or more lateral openings for flow over at least a portion of its height through which a liquid phase can enter the fluid distribution conduit, and having a cylindrical passageway for gas having an inlet connected to the upper cross section and having an outlet extending below the lateral openings for the liquid phase, thereby forming an annular passageway for the liquid phase; the upper cross section for flow allowing the majority of the gas phase of the mixture to pass and the lateral openings for flow allowing the passage of the liquid phase into the fluid distribution conduit and at least a portion of the gas phase; and a venturi nozzle having an inlet and an outlet fixedly coupled to and co-axially aligned with the lower cross section of the conduit for accelerating and dispersing the liquid and gas phases passing out of the conduit.

In an alternate embodiment, the invention includes a nozzle device for coupling with a fluid distribution conduit for improving the distribution of a downwardly flowing poly-phase mixture, optionally including at least one gas phase and at least one liquid phase, above at least one bed of granular solid. The fluid distribution conduit for receiving liquid and gas phases has one or more lateral openings for flow over an upper portion of its height through which a gas phase can enter and has fluid distribution conduit having one or more lateral openings for flow over at least a lower portion of its height through which a liquid phase can enter the fluid distribution conduit. It also has at least one lower cross section for flow through which a mixture of gas and liquid communicate with a bed of granular solid. The nozzle device includes a venturi nozzle having an inlet and an outlet, the nozzle having an outer diameter not greater than an inner diameter of the lower cross section of the fluid distribution conduit, wherein the nozzle device may be fixedly coupled to and co-axially aligned with the lower cross section of the fluid distribution conduit. It is for accelerating and dispersing the liquid and gas phases passing out of the conduit.

In an alternate embodiment, the invention includes a nozzle device for coupling with a fluid distribution conduit for improving the distribution of a upwardly flowing poly-phase mixture, including at least one gas phase and at least one liquid phase, where the fluid distribution conduit for receiving liquid and gas phases has one or more openings for flow of the poly-phase mixture; said nozzle device comprising a venturi nozzle having an inlet and an outlet, the nozzle having an outer diameter not greater than an inner diameter of the upper cross section of the fluid distribution conduit, wherein the nozzle device may be fixedly coupled to and co-axially aligned with the upper cross section of the fluid distribution conduit for accelerating and dispersing the liquid and gas phases passing out of the conduit.

These and other features and advantages of the present invention will be made more apparent through a consideration of the following detailed description of preferred embodiments of the invention. In the course of this description, frequent reference will be made to the attached drawings.

In another alternate embodiment, the invention includes a fluid distribution assembly including: a fluid distribution conduit for distribution of a downwardly flowing poly-phase mixture, where the fluid distribution conduit is configured and adapted for receiving a liquid phase and a gas phase and having one or more lateral openings for flow over an upper portion of its height through which a gas phase can enter and having one or more lateral openings for flow over at least a lower portion of its height through which a liquid phase can enter; and at least one lower cross section for flow through which a mixture of gas and liquid communicate with a bed of granular solid; and a venturi nozzle coupled with the fluid distribution conduit, the venturi nozzle having an upper portion outer diameter not greater than an inner diameter of the lower cross section of the fluid distribution conduit, wherein the nozzle device and wherein the venturi nozzle is co-axially aligned with the lower cross section of the fluid distribution conduit and is configured and adapted for accelerating and dispersing the liquid and gas phases passing out of the conduit.

VI. DETAILED DESCRIPTION OF THE DRAWINGS AND PREFERRED EMBODIMENTS

Figure 1:
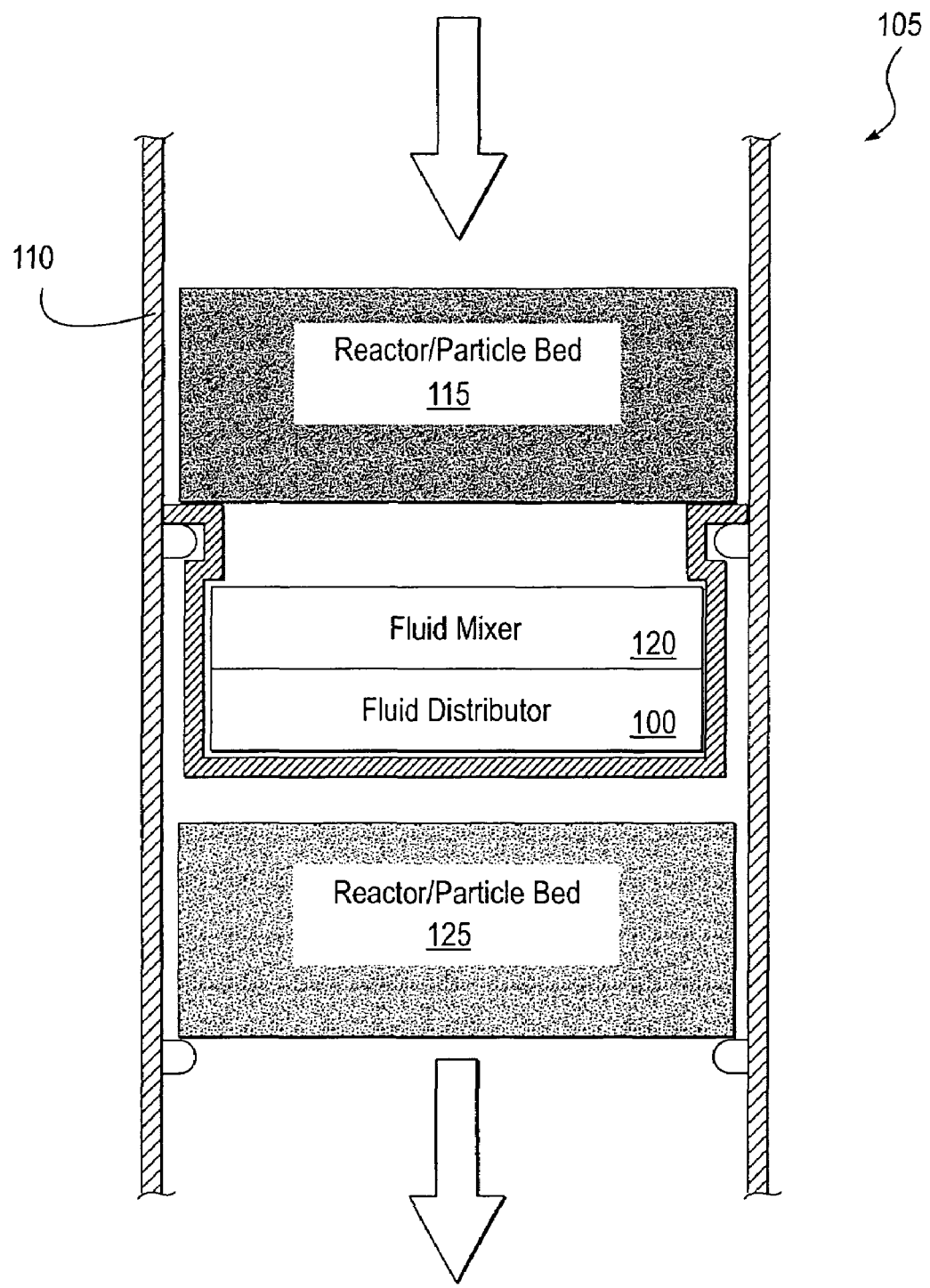

FIG. 1 is a schematic, perspective side cut-away view showing the fluid distributor assembly according to the present invention in the context of a reactor vessel. The reactor vessel 105 has a cylindrical reactor wall 110. Reactor vessel 105 is configured for supporting fluid mixer 120 and catalyst beds 115-125 containing packed particulate catalytic material (not shown) in vertically superimposed relation to each other to permit liquid and gas to flow from a higher catalyst bed 115 to a lower catalyst bed 125.

Fluid distributor assembly 100 is optionally supported in a "basket" hanging from and below a suitable mounting means. Lower catalyst bed 125 is below the distributor assembly 100. The fluid distributor assembly 100 of the present invention is mounted to the reactor wall 110 to receive liquid and gas flowing down from fluid mixer 120 and to distribute the liquid and gas to catalyst bed 125.

Figure 2:
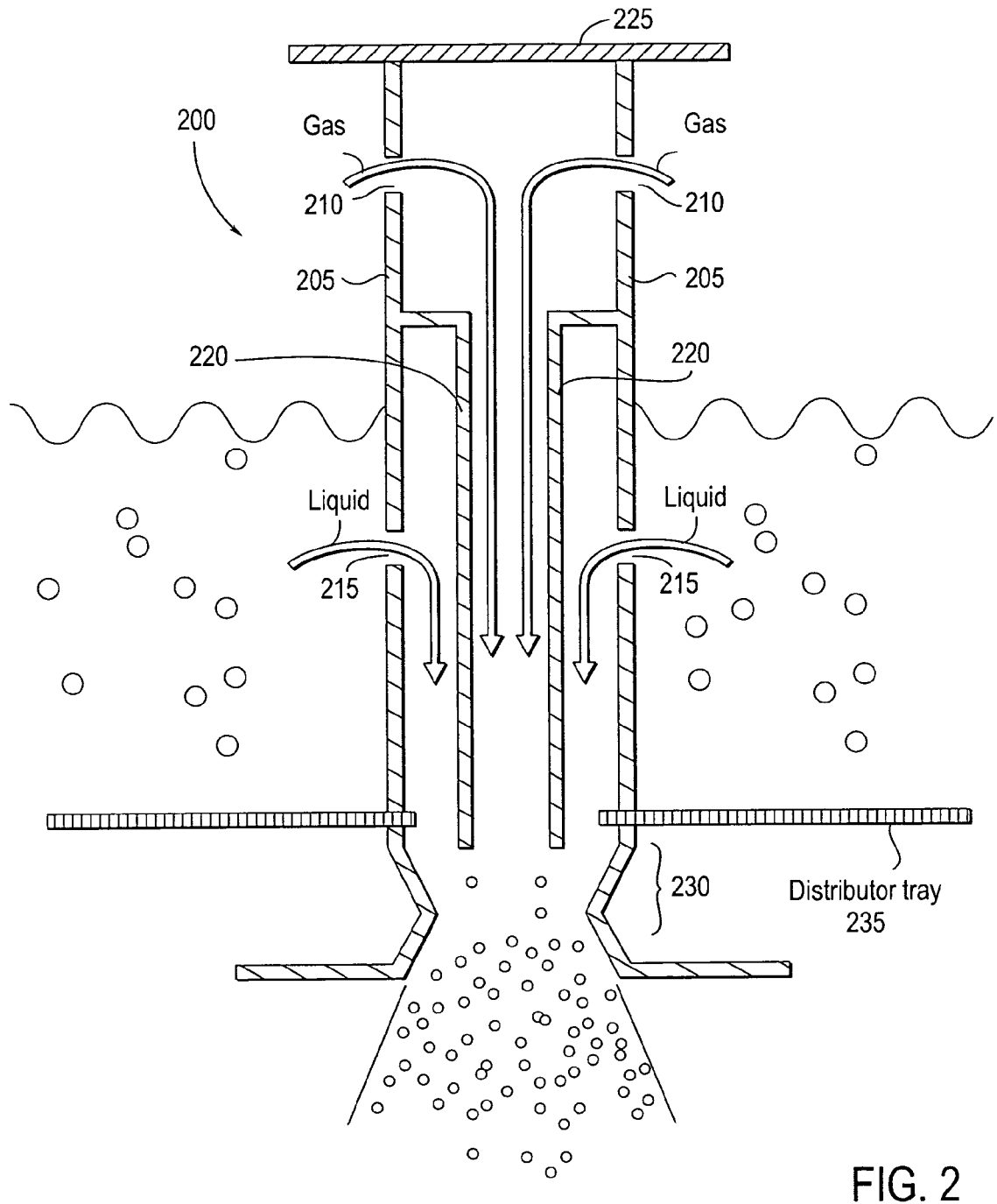
Figure 3:
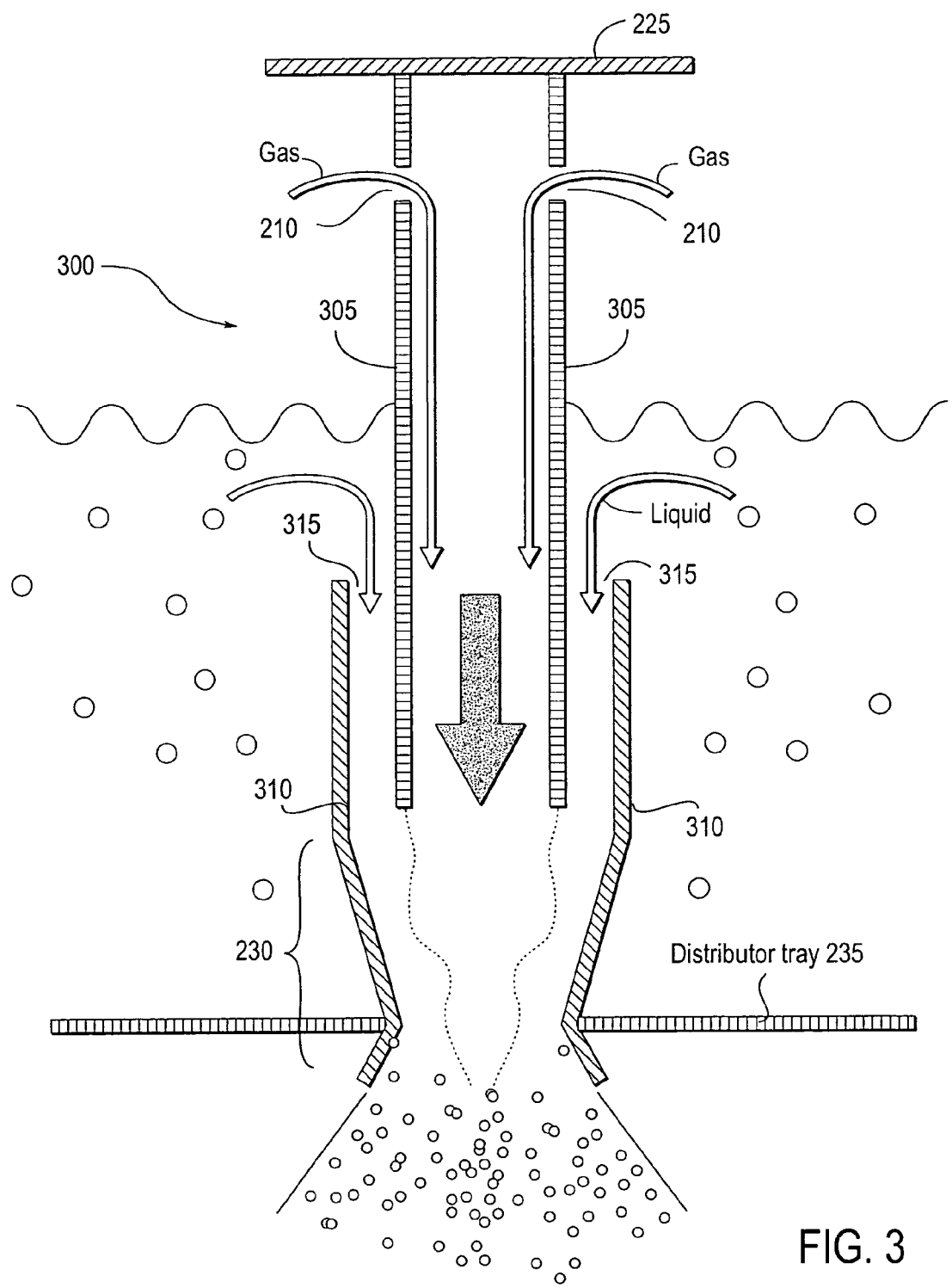

FIGS. 2 and 3 show two different preferred embodiments of the invention. FIG. 2 is a schematic, perspective side cut-away view of another preferred embodiment of the distributor assembly 200 according to the present invention having slotted passageways 210 and 215 for both liquid and gas, a cylindrical passageway 220 for gas connected to the slotted passageway for gas 210, and having the outlet of the cylindrical passageway for the gas extending below the slotted passageways 215 for the liquid and forming an annular passageway for the liquid. In this design, gas and liquid enter the distributor separately and are made to intimately mix as they exit the device.

The gas enters the inner pipe through small holes 210 located near the top 225. The holes will be sized to result in a high gas velocity through the inner pipe. The liquid phase enters the annular area between the two concentric pipes, 205 and 220, through holes 215 located near the middle of the riser below the expected liquid level. The liquid flows by the pressure differential exerted on the liquid phase. The hydrostatic head plays a lesser role in determining the liquid flow from an individual device. The liquid port 215 converges somewhat at the outlet to allow the liquid flow directly into the high velocity gas exiting the inner pipe 220 below the distributor tray. The liquid and gas pass through a converging/diverging, i.e., Venturi, nozzle 230. It produces a greater dispersion of liquid and a greater degree of gas-liquid mixing and heat exchange. As used in this specification and accompanying claims "venturi" or "venturi nozzle" means a system for speeding the flow of a fluid by constricting its flow in a cone-shaped conduit. The scientific principle underlying the system is a fluid passing through smoothly varying constrictions experience changes in velocity and pressure, as described by Bernoulli's principle. Preferably, the venturi nozzle is made of two truncated cone-shaped conduits, where the truncation is at the "top", i.e., narrow end, of the cone-shaped conduits, and the two truncated cone-shaped conduits are fixedly connected co-axially at the truncated tops. Such a system may also be manufactured in various conventional ways, e.g., cut/machined from a single piece of metal or forged from molten metal or other material.

The design will make the flow distribution less sensitive to out-of-levelness of the distributor tray and to variations in flow rates. The design also facilitates gas-liquid mixing and heat exchange. Other advantages are its simplicity, compactness and easy adaptation to achieve smaller spacing between distributors. With no caps, the tray will be easier to maintain. Another potential advantage is that the perforated tray can be simplified further and designed for a much lower pressure drop, or even be completely eliminated.

FIG. 3 depicts is a schematic, perspective side cut-away view of another preferred embodiment 300 of the distributor assembly according to the present invention having slotted passageways 210 for gas connected to a cylindrical passageway for gas and having only an annular passageway for liquid 315. The high velocity gas has an aspirating effect on the liquid flow. The liquid port is an annular passage formed by the interior of wall 310 and the exterior of wall 305. The embodiment has a diverging nozzle 230 at the bottom. In both of these embodiments in FIGS. 2 and 3, a small baffle plate (not shown) at the bottom of the riser can be added for further dispersion of the spray.

Figure 4:
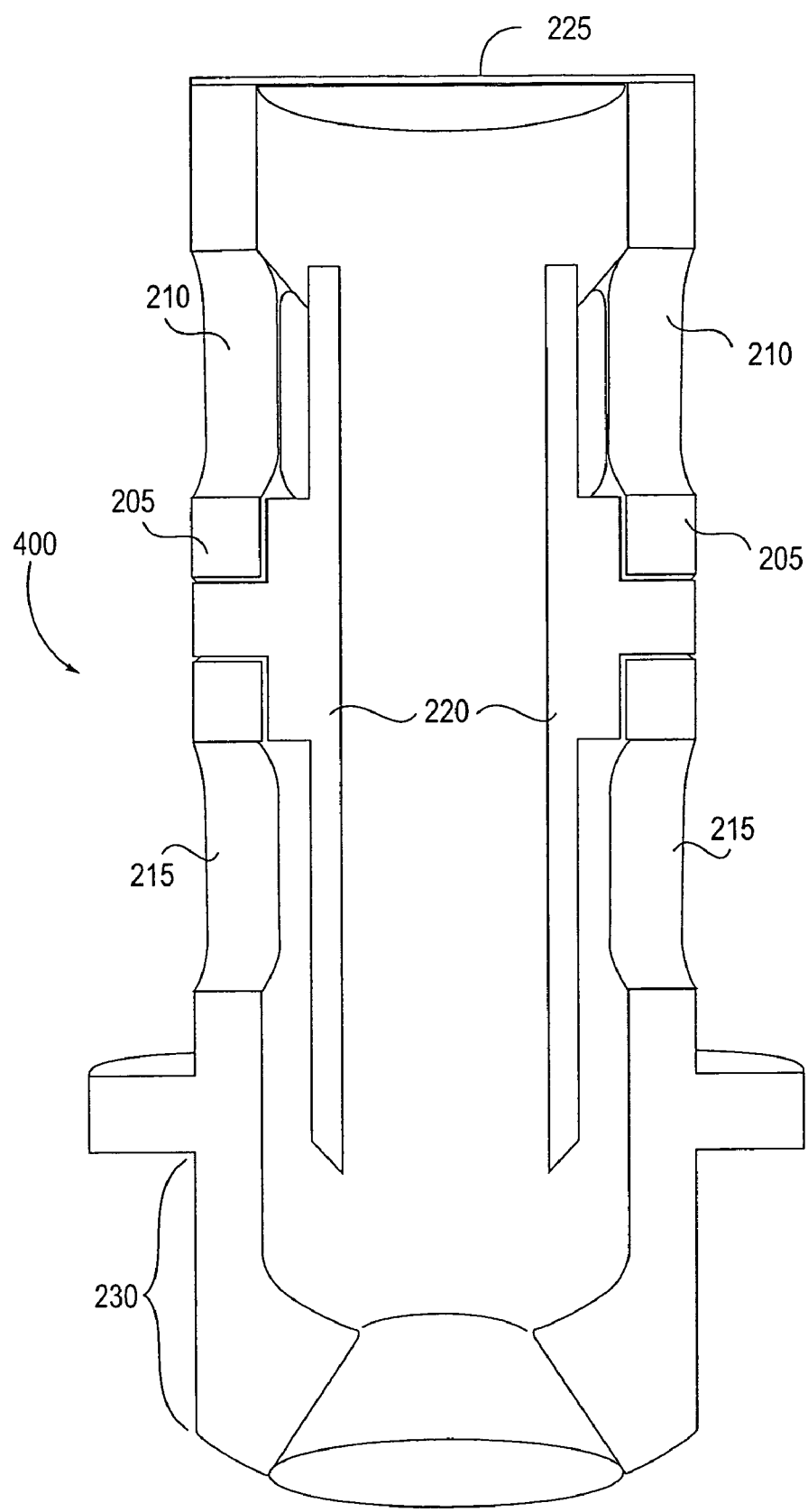

FIG. 4 is similar to FIG. 2 but includes an integral cap 405 above the slotted passageways 210 for gas, wherein in use the gas must enter the cap 405 before entering the cylindrical passageway 210 for gas.

Figure 5:
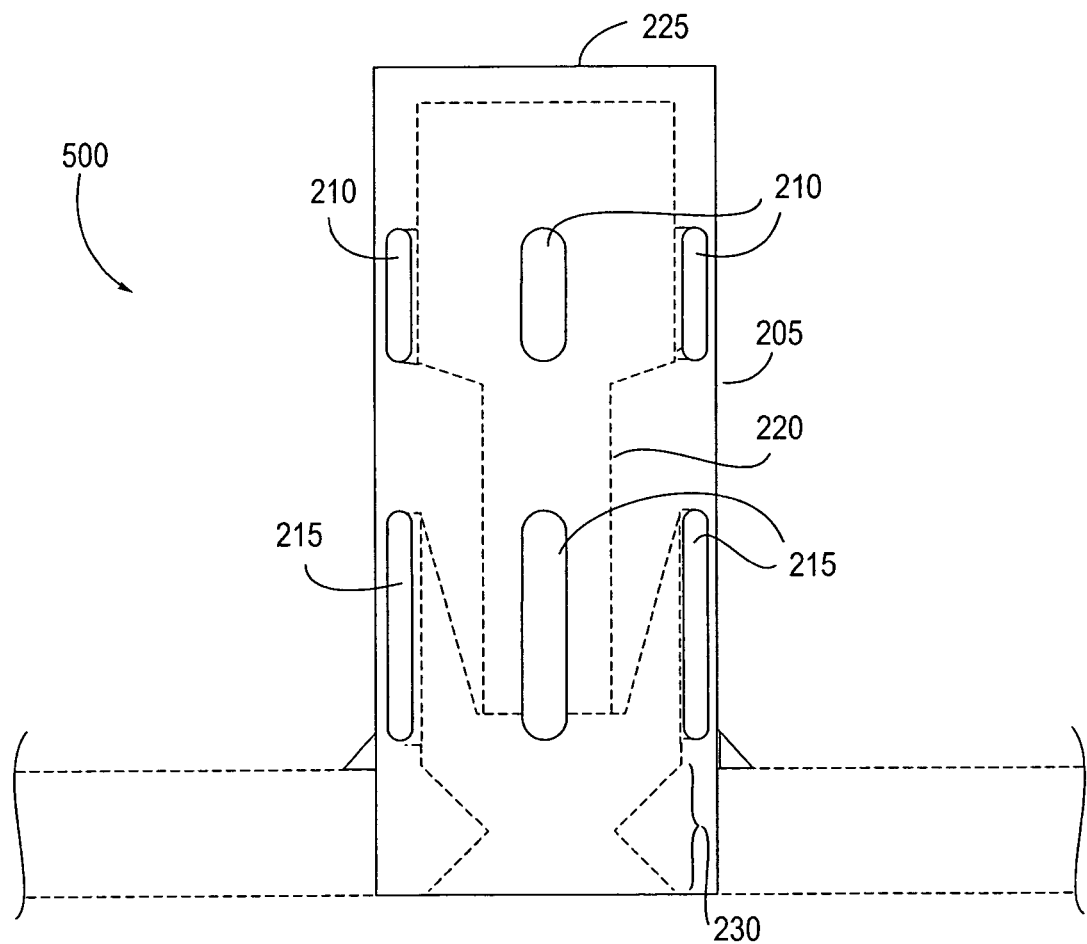
FIG. 5 is similar to FIGS. 2 and 4 but does not include an annular passageway for liquid connected to the slotted passageways for liquid.

FIG. 5 is similar to FIGS. 2 and 4 but does not include an integral cap 405 and does not have an annular passageway for liquid connected to the slotted passageways 215 for liquid.

Figure 6:
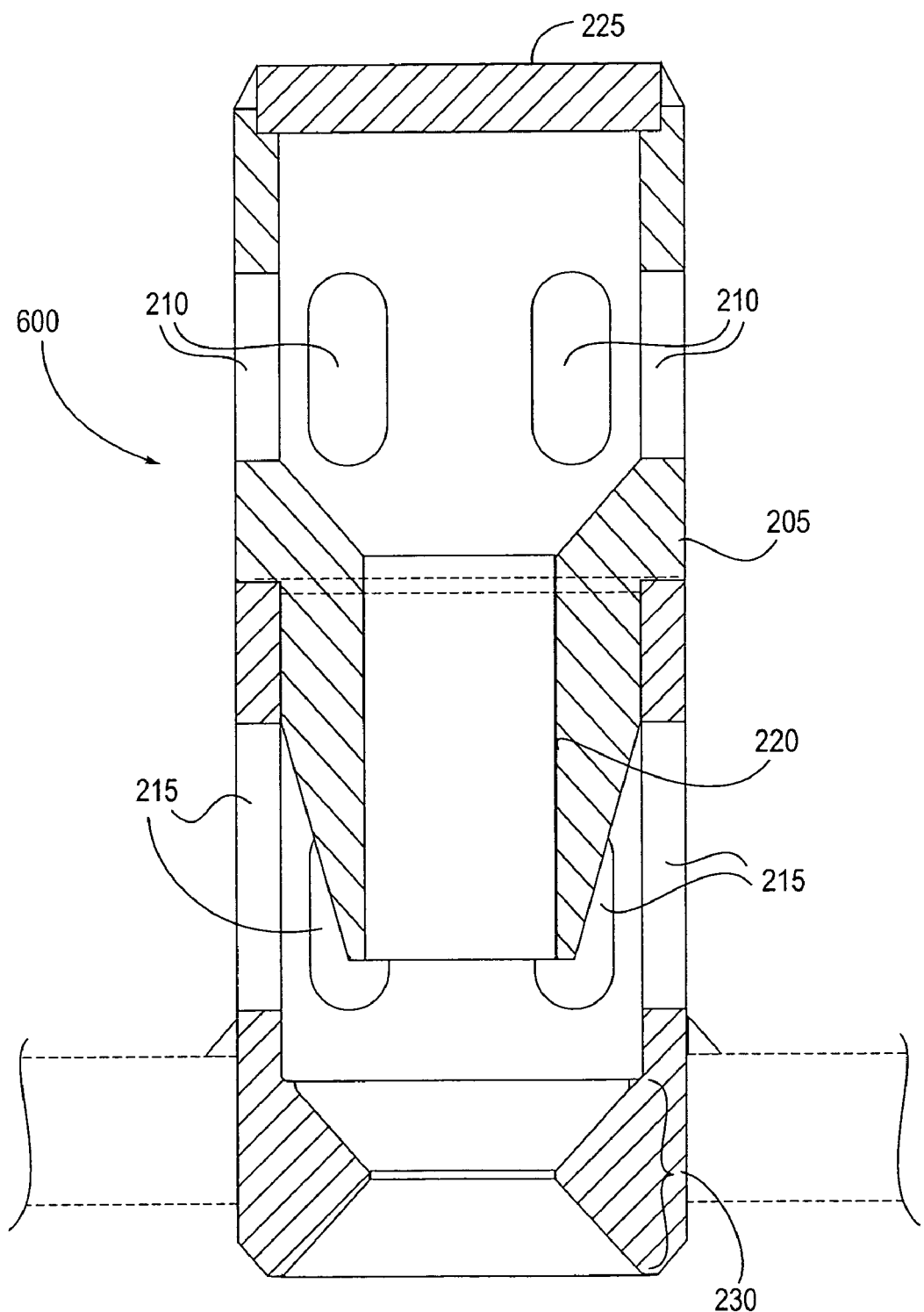
FIG. 6 is a cut-away view of the embodiment of FIG. 5.

FIG. 6 is a cut-away view of the embodiment of FIG. 5.

FIG. 7 is a schematic, perspective side cut-away view of another embodiment 900 of the distributor assembly according to the present invention having a conventional riser with a slotted passageways 915 gas and liquid and a cylindrical passageway 920 for gas with a retrofitted venturi nozzle/outlet 230 and sleeve 235.

FIG. 8 is a schematic, perspective side cut-away view of a lower portion of the embodiment 900 of FIG. 7 showing the gas/liquid venturi-shaped outlet 230 and sleeve portion 235 forming an integral assembly 1000. This assembly 1000 is preferably adapted and configured for retrofitting conventional risers by sliding the sleeve into the conventional riser outlet and attaching by any conventional means. Integral assembly 1000, and other embodiments thereof, can be installed in any conventional riser, whether a chimney-type riser as shown in FIG. 7 or a bubble cap distributor (not shown) and any other existing flow distributor for, e.g., hydroprocessing reactors. Integral assembly 1000 can also be used in up flow reactor to provide uniform two and multiphase flow distribution.

Thus, integral assembly 1000 may be fixedly coupled to and co-axially aligned with the upper cross section of a fluid distribution conduit for accelerating and dispersing the liquid and gas phases passing out of the conduit. The fluid distribution conduits are preferably adapted and configured to produce a fluid spray pattern wherein the ratio of the diameter of the fluid spray pattern to the diameter of the widest point of the venturi nozzle is from about 1:1 to about 10:1 and more preferably from about 3:1 to about 7:1.

Figure 9:
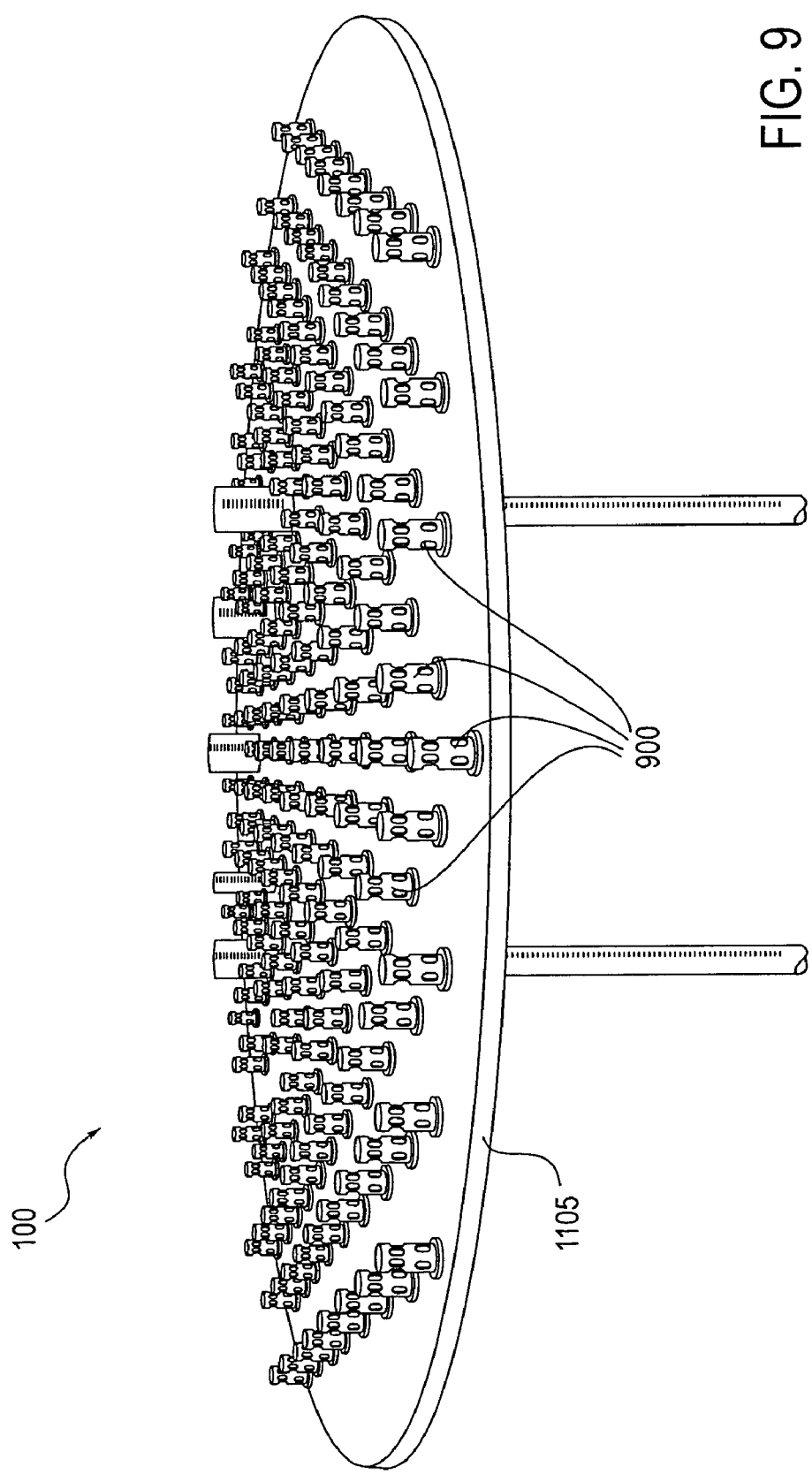
FIG. 9 is a schematic, isometric, perspective view depicting one embodiment of a plurality of the distributor assemblies arrayed on a plate and configured for placement in a reactor vessel.

FIG. 9 is a schematic, isometric, perspective view depicting one embodiment 100 (see FIG. 1) of a plurality of the distributor assemblies 900 arrayed on a plate 1105 and configured for placement in a reactor vessel (shown in FIG. 1). The fluid distribution conduits are spaced from about 5 inches to about 7 inches apart.

FIGS. 10 and 11 are photographs taken during tests carried out on an experimental model in accordance with one embodiment of the invention showing the good performance of the invention in performing liquid distributions from the distributor assembly. In contrast, known risers or downcomers, such as shown, e.g., in FIG. 7, but without the venturi nozzle and sleeve assembly of the invention shown in one embodiment in FIG. 8, have poor distribution patterns. In some case such known risers/chimneys only distribute two liquid streamlines coming out the chimney.

Each venturi nozzle has a diameter at its widest point of from about ½ inch to about 4 inches, preferably from about 1 inch to about 2 inches. Each venturi nozzle has a diameter at its narrowest point of from about ¼ inch to about 2 inches, preferably of from about ½ inch to about 1 inch.

The distributor device optionally includes a plate attached below the outlet of the venturi nozzle. It's positioned about 2 inches to about 10 inches, preferably from about 3 inches to about 5 inches, above the bed of granular solid. It is for enhancing dispersion of the fluid stream by providing a strike point for a portion of the fluid which will result in splattering into droplets. The optional plate is positioned from about 2 inches to about 10 inches below the outlet of the venturi nozzle and preferably from about 2 inches to about 4 inches. The plate is optionally fixedly or removably attached to a bottom portion of the distribution plate or a bottom portion of the fluid distribution column or the venturi nozzle.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A distributor device for distributing a downwardly flowing poly-phase mixture, comprising at least one gas phase and at least one liquid phase, above at least one bed of granular solid, said device comprising:
   a. at least one tray located above a bed of granular solid;
   b. a plurality of fluid distribution conduits for receiving liquid and gas phases, each of said conduits comprising at least one upper cross section for flow through which a gas phase can enter said mixer conduit, and at least one lower cross section for flow through which a mixture of gas and liquid communicate with a bed of granular solid, said fluid distribution conduits having one or more lateral openings for flow over at least a portion of their height through which a liquid phase can enter said fluid distribution conduit, and having a cylindrical passageway for gas having an inlet connected to the upper cross section and having an outlet extending below the lateral openings for the liquid phase, thereby forming an annular passageway for the liquid phase;
   c. said upper cross section for flow allowing the majority of the gas phase of said mixture to pass and said lateral openings for flow allowing the passage of the liquid phase into said fluid distribution conduits and at least a portion of the gas phase; and
   d. a venturi nozzle having an inlet and an outlet fixedly coupled to and co-axially aligned with the lower cross section of the conduit for accelerating and dispersing the liquid and gas phases passing out of the conduit.

2. The distributor device of claim 1, wherein the fluid distribution conduits are spaced from about 2 inches to about 10 inches apart.

3. The distributor device of claim 1, wherein the fluid distribution conduits are spaced from about 5 inches to about 7 inches apart.

4. The distributor device of claim 1, further comprising a plate attached below the outlet of the venturi nozzle and from about 2 inches to about 10 inches above the bed of granular solid for enhancing dispersion of the fluid stream.

5. The distributor device of claim 1, further comprising a plate attached below the outlet of the venturi nozzle and from about 3 inches to about 5 inches above the bed of granular solid for enhancing dispersion of the fluid stream.

6. The distributor device of claim 4, wherein the plate is from about 2 inches to about 10 inches below the outlet of the venturi nozzle.

7. The distributor device of claim 4, wherein the plate is from about 2 inches to about 4 inches below the outlet of the venturi nozzle.

8. The distributor device of claim 1, wherein each venturi nozzle has a diameter at its widest point of from about ½ inch to about 4 inches.

9. The distributor device of claim 1, wherein each venturi nozzle has a diameter at its widest point of from about 1 inch to about 2 inches.

10. The distributor device of claim 1, wherein each venturi nozzle has a diameter at its narrowest point of from about ¼ inch to about 2 inches.

11. The distributor device of claim 1, wherein the venturi nozzle has a diameter at its narrowest point of from about ½ inch to about 1 inch.

12. The distributor device of claim 1, wherein the fluid distribution conduits are adapted and configured to produce a fluid spray pattern wherein the ratio of the diameter of the fluid spray pattern to the diameter of the widest point of the venturi nozzle is from about 1:1 to about 10:1.

13. The distributor device of claim 1, wherein the fluid distribution conduits are adapted and configured to produce a fluid spray pattern wherein the ratio of the diameter of the fluid spray pattern to the diameter of the widest point of the venturi nozzle is from about 3:1 to about 7:1.

14. A distributor device for distributing a downwardly flowing poly-phase mixture, comprising at least one gas phase and at least one liquid phase, above at least one bed of granular solid, said device comprising:
   a. a fluid distribution conduit for receiving liquid and gas phases, said fluid distribution conduit having one or more lateral openings for flow over an upper portion of its height through which a gas phase can enter said fluid distribution conduit; said fluid distribution conduit having one or more lateral openings for flow over at least a lower portion of its height through which a liquid phase can enter said fluid distribution conduit; and at least one lower cross section for flow through which a mixture of gas and liquid communicate with a bed of granular solid, and having a cylindrical passageway for gas having an inlet connected to the upper portion lateral openings of the fluid distribution conduit for the gas phase and having an outlet extending below the lower portion lateral openings of the fluid distribution conduit for the liquid phase, thereby forming an annular passageway for the liquid phase;
   b. said lateral openings over an upper portion of its height for allowing the majority of the gas phase of said mixture to pass and said lateral openings over a lower portion of its height for allowing the passage of the liquid phase into said fluid distribution conduits; and c. a venturi nozzle having an inlet and an outlet fixedly coupled and co-axially aligned to the lower cross section of the conduit for accelerating and dispersing the liquid and gas phases passing out of the conduit.

15. The distributor device of claim 14, further comprising a plate attached below the outlet of the venturi nozzle and from about 3 inches to about 5 inches above the bed of granular solid for enhancing dispersion of the fluid stream.

16. The distributor device of claim 15, wherein the plate is from about 2 inches to about 4 inches below the outlet of the venturi nozzle.

17. The distributor device of claim 14, wherein the venturi nozzle has a diameter at its widest point of from about 1 inch to about 2 inches.

18. The distributor device of claim 14, wherein the venturi nozzle has a diameter at its narrowest point of from about ½ inch to about 1 inch.

19. The distributor device of claim 14, wherein the fluid distribution conduits are adapted and configured to produce a fluid spray pattern wherein the ratio of the diameter of the fluid spray pattern to the diameter of the widest point of the venturi nozzle is from about 3:1 to about 7:1.

20. A distributor device for distributing a downwardly flowing poly-phase mixture, comprising at least one gas phase and at least one liquid phase, above at least one bed of granular solid, said device comprising:
   a. a fluid distribution conduit for receiving liquid and gas phases, said conduit comprising at least one upper cross section for flow through which a gas phase can enter said mixer conduit, and at least one lower cross section for flow through which a mixture of gas and liquid communicate with a bed of granular solid, said fluid distribution conduit having one or more lateral openings for flow over at least a portion of its height through which a liquid phase can enter said fluid distribution conduit, and having a cylindrical passageway for gas having an inlet connected to the upper cross section and having an outlet extending below the lateral openings for the liquid phase, thereby forming an annular passageway for the liquid phase;
   b. said upper cross section for flow allowing the majority of the gas phase of said mixture to pass and said lateral openings for flow allowing the passage of the liquid phase into said fluid distribution conduit and at least a portion of the gas phase; and
   c. a venturi nozzle having an inlet and an outlet fixedly coupled to and co-axially aligned with the lower cross section of the conduit for accelerating and dispersing the liquid and gas phases passing out of the conduit.

21. The distributor device of claim 20, further comprising a plate attached below the outlet of the venturi nozzle and from about 3 inches to about 5 inches above the bed of granular solid for enhancing dispersion of the fluid stream.

22. The distributor device of claim 21, wherein the plate is from about 2 inches to about 4 inches below the outlet of the venturi nozzle.

23. The distributor device of claim 20, wherein the venturi nozzle has a diameter at its widest point of from about 1 inch to about 2 inches.

24. The distributor device of claim 20, wherein the venturi nozzle has a diameter at its narrowest point of from about ½ inch to about 1 inch.

25. The distributor device of claim 20, wherein the fluid distribution conduits are adapted and configured to produce a fluid spray pattern wherein the ratio of the diameter of the fluid spray pattern to the diameter of the widest point of the venturi nozzle is from about 3:1 to about 7:1.

26. A nozzle device for coupling with a fluid distribution conduit for improving the distribution of a downwardly flowing poly-phase mixture, comprising at least one gas phase and at least one liquid phase, above at least one bed of granular solid, where the fluid distribution conduit for receiving liquid and gas phases has one or more lateral openings for flow over an upper portion of its height brough which a gas phase can enter and has fluid distribution conduit having one or more lateral openings for flow over at least a lower portion of its height through which a liquid phase can enter said fluid distribution conduit; and at least one lower cross section for flow through which a mixture of gas and liquid communicate with a bed of granular solid; said nozzle device comprising a venturi nozzle having an outer diameter not greater than an inner diameter of the lower cross section of the fluid distribution conduit, and having a cylindrical passageway for gas having an inlet connected to the upper portion of the fluid distribution conduit and having an outlet extending below the lateral openings for the liquid phase, thereby forming an annular passageway for the liquid phase; wherein the nozzle device may be fixedly coupled to and co-axially aligned with the lower cross section of the fluid distribution conduit for accelerating and dispersing the liquid and gas phases passing out of the conduit.

27. The nozzle device of claim 26, wherein the venturi nozzle has a diameter at its widest point of from about 1 inch to about 2 inches.

28. The nozzle device of claim 26, wherein the venturi nozzle has a diameter at its narrowest point of from about ½ inch to about 1 inch.

29. The nozzle device of claim 26, wherein the venture nozzle is adapted and configured to produce a fluid spray pattern wherein the ratio of the diameter of the fluid spray pattern to the diameter of the widest point of the venturi nozzle is from about 3:1 to about 7:1.

30. A nozzle device for coupling with a fluid distribution conduit for improving the distribution of a upwardly flowing poly-phase mixture, comprising at least one gas phase and at least one liquid phase, where the fluid distribution conduit for receiving liquid and gas phases has one or more openings for flow of the poly-phase mixture; said nozzle device comprising a venturi nozzle having an outer diameter not greater than an inner diameter of the upper cross section of the fluid distribution conduit, and having a cylinder passageway for gas having an inlet connected to an upper portion of the fluid distribution conduit and having an outlet extending to a lower portion of the fluid distribution conduit for the liquid phase, thereby forming an annular passaeway for the liquid phase; wherein the nozzle device may be fixedly coupled to and co-axially aligned with the upper cross section of the fluid distribution conduit for accelerating and dispersing the liquid and gas phases passing out of the conduit.

31. The nozzle device of claim 30, wherein each venturi nozzle has a diameter at its widest point of from about 1 inch to about 2 inches.

32. The nozzle device of claim 30, wherein the venturi nozzle has a diameter at its narrowest point of from about ½ inch to about 1 inch.

33. A fluid distribution assembly comprising:
   a. a fluid distribution conduit for distribution of a downwardly flowing poly-phase mixture, where the fluid distribution conduit is configured and adapted for receiving a liquid phase and a gas phase and having one or more lateral openings for flow over an upper portion of its height through which a gas phase can enter and having one or more lateral openings for flow over at least a lower portion of its height through which a liquid phase can enter; and at least one lower cross section for flow through which a mixture of gas and liquid communicate with a bed of granular solid; and having cylindrical passageway for the gas phase having an inlet connected to the upper portion cross section and having an outlet extending below the lateral opening for liquid phase; thereby forming an annular passageway for the liquid phase; and b. a venturi nozzle coupled with the fluid distribution conduit, the venturi nozzle having an upper portion outer diameter not greater than an inner diameter of the lower cross section of the fluid distribution conduit, wherein the nozzle device and wherein the venturi nozzle is co-axially aligned with the lower cross section of the fluid distribution conduit and is configured and adapted for accelerating and dispersing the liquid and gas phases passing out of the conduit.

34. The fluid distribution assembly of claim 31, wherein the venturi nozzle is fixedly coupled to the fluid distribution conduit.

35. The fluid distribution assembly of claim 31, wherein the venturi nozzle is removably coupled to the fluid distribution conduit.

36. The fluid distribution assembly of claim 31, wherein each venturi nozzle has a diameter at its widest point of from about 1 inch to about 2 inches.

37. The fluid distribution assembly of claim 31, wherein the venturi nozzle has a diameter at its narrowest point of from about ½ inch to about 1 inch.

* * * * *